Aug. 15, 1939.   J. C. HESTER   2,169,446
TRANSPORTATION MEANS FOR REFRIGERATING UNIT CONTAINERS
Filed Oct. 24, 1938

Inventor
John C. Hester
By
Attorneys

Patented Aug. 15, 1939

2,169,446

UNITED STATES PATENT OFFICE 2,169,446

TRANSPORTATION MEANS FOR REFRIGERATING UNIT CONTAINERS

John C. Hester, Milwaukee, Wis., assignor of one-half to Godfrey Oestreich, Milwaukee, Wis.

Application October 24, 1938, Serial No. 236,807

2 Claims. (Cl. 254—100)

My invention has for its object to provide simple, economical, and effective transportation means for a group of refrigerator units.

With the above and other objects in view, my invention consists in certain peculiarities of construction and arrangement of parts, as will be hereinafter fully set forth in connection with the accompanying drawing and subsequently claimed.

Figure 1:
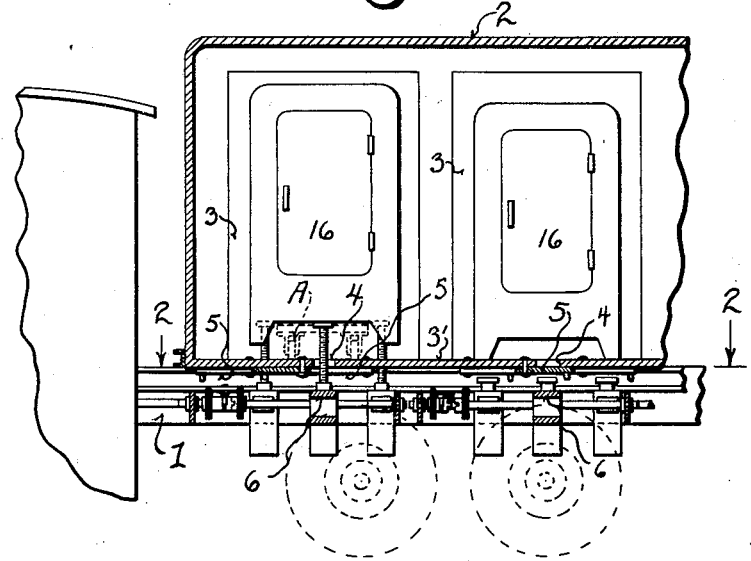
Figure 1 represents a fragmentary, sectional elevation of a truck having mounted thereon transportation means embodying the features of my invention, the section being indicated by line 1—1 of Figure 2.
Figure 2:
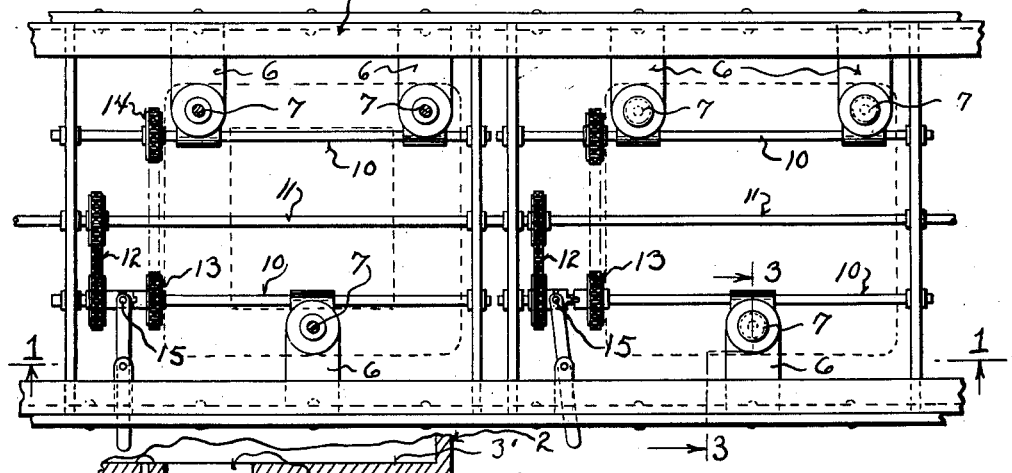
Figure 2 is a plan section of the same, the section being indicated by line 2—2 of Figure 1.
Figure 3:
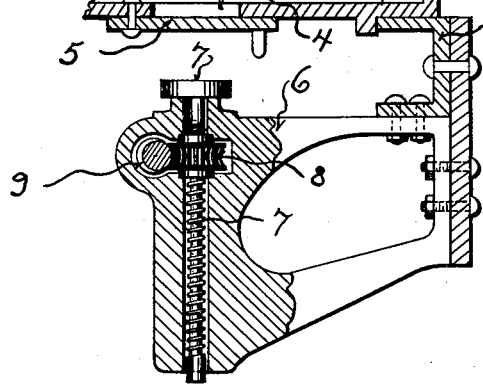
Figure 3 is an enlarged, detailed sectional elevation through one of the lifting jacks.

Referring by characters to the drawing, 1 represents the frame of a truck, or other wheeled transportation vehicle, and 2 a housing mounted thereon, having doors 3. The bottom 3' of the housing is provided with a plurality of openings 4, which may be closed by plates 5, the same being shown pivotally connected, but it is understood that said plates may be slidably arranged.

Secured to the frame 1 is a plurality of brackets 6, having jacks vertically mounted therein in the form of screw spindles 7, carrying worm wheels 8 in meshed engagement with corresponding worms 9, which are mounted upon countershafts 10—10, the said countershafts being seated in certain journals, as is also a centrally disposed power shaft 11 which may be driven from the engine of the vehicle (not shown). Power is directly transmitted from the shaft 11 by a chain and sprocket gear 12—12, and said power is transmitted from its drive by chain and sprocket wheels 13 and 14 to the opposite countershafts.

It is understood that the sprocket wheels 13, which are carried by the shafts 10, are provided with manually controlled clutch elements 15—15, whereby drive from the main shaft 11 may be selectively imparted to one or any number of alined groups of the countershafts 10—10.

It will also be noted that the openings 4 in the bottoms of the housings are alined with separate groups of the screw spindles 7, and each of said groups is positioned under a unit container or refrigerating box 16, having legs normally resting upon the floor of the housing.

From the foregoing description, it will be noted that in the event any one of the series of the refrigerating units is to be removed for delivery, the plates 5 of the housing will be swung to expose the openings 4 in said housing floor, and thereafter this container unit is lifted a sufficient distance from the floor by the group of jacks to permit insertion under said container of a truck or dolly, as indicated in dotted lines at A. This elevated position of the container will result, due to the fact that the clutch control 15 is manipulated to throw into gear the countershafts 10—10 and associated spindles 7. After the dolly A is placed under the container, it is discharged through the door 3 of the housing.

In the event that the entire group of refrigerating units is to be delivered at one point, the housing 2 in its entirety is elevated by a pair of the groups of jack screws 7, it being understood that in this operation the plates 5 are positioned to close the openings 4, whereby the jack screws will abut the plates and bodily lift the housing, which housing can then be readily shifted from the frame by suitable trucks or dollies.

Changes in details may be made without departing from the spirit or the scope of the invention as defined by the claims, but what I claim as new is:

1. A conveyance for a group of unit containers comprising a truck frame having a housing mounted thereon adapted to receive a group of individual containers, the same having a series of apertures in its bottom and means for selectively closing the same, and clutch control power driven screw spindles alined with the housing bottom apertures, whereby selective containers may be raised for removal from the housing when the apertures are exposed and the housing may be bodily lifted when said openings are closed to facilitate removal of said housing from its truck frame.

2. A housing carrying a group of unit containers, and common lifting jack means for selectively moving any one of the group of containers or the housing bodily with its load of said containers.

JOHN C. HESTER.